E. O. SEAWRIGHT.
ROTARY ENGINE.
APPLICATION FILED APR. 23, 1915.
1,168,968.
Patented Jan. 18, 1916.
2 SHEETS—SHEET 1.
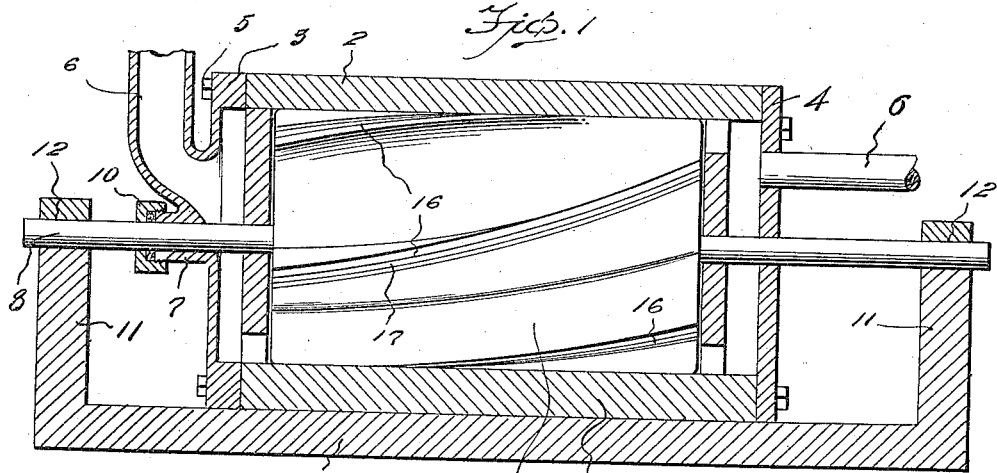
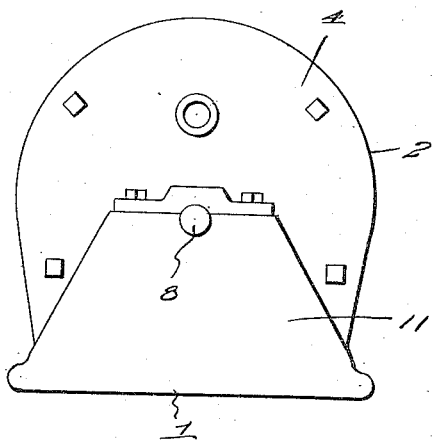
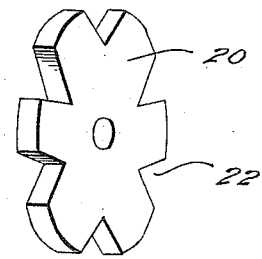
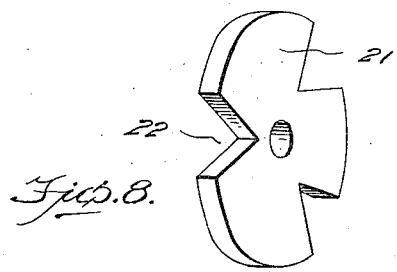
Inventor
E. O. Seawright.
Witnesses

E. O. SEAWRIGHT.
ROTARY ENGINE.
APPLICATION FILED APR. 23, 1915.

1,168,968.

Patented Jan. 18, 1916.
2 SHEETS—SHEET 2.

Witnesses

Inventor
E. O. Seawright.
By
Attorney

UNITED STATES PATENT OFFICE.

EUGENE O. SEAWRIGHT, OF HAMLIN, KENTUCKY.

ROTARY ENGINE.

1,168,968.   Specification of Letters Patent.   Patented Jan. 18, 1916.

Application filed April 23, 1915.  Serial No. 23,390.

*To all whom it may concern:*

Be it known that I, EUGENE O. SEAWRIGHT, a citizen of the United States, residing at Hamlin, in the county of Calloway and State of Kentucky, have invented certain new and useful Improvements in Rotary Engines; and I do hereby declare the following to be a full, clear, and exact description of the invention, such as will enable others skilled in the art to which it appertains to make and use the same.

This invention relates to rotary engines, of the turbine type, and the primary object of the invention is to provide an engine which is comparatively simple in construction, easy to manufacture and which will generate a maximum amount of power upon the utilization of a minimum of fuel.

Another object of this invention is to provide a rotary engine of the turbine type which is provided with a rotor having a plurality of radially extending spiral blades which are acted upon by the force of the fuel entering into the cylinder of the machine, for rotating the rotor and consequently the power shaft which is seated or otherwise fastened to the rotor for synchronous rotation therewith.

A still further object of this invention is to provide a novel form of inlet and exhaust valves or port controlling means for regulating the inlet and exhaust of fuel into and out of the engine.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 3:
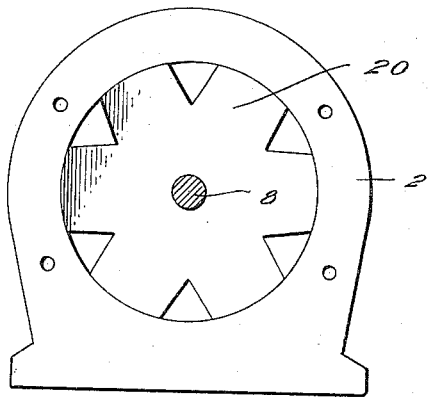
Figure 4:
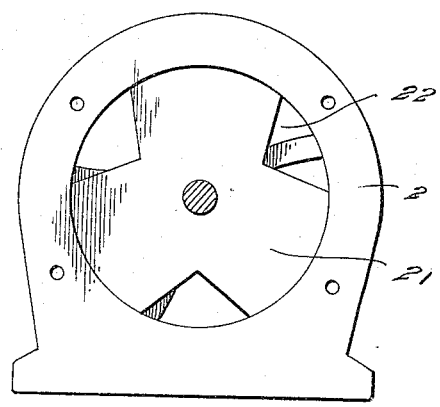
Figure 5:
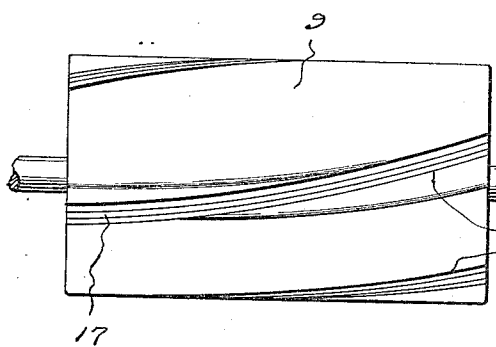
Figure 6:
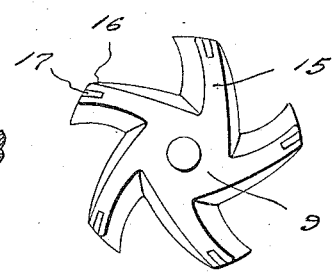
Figure 9:
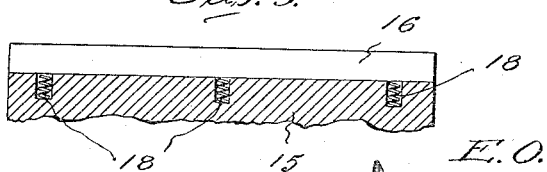

Figure 1 is a longitudinal section through the improved engine, Fig. 2 is an end view of the engine, Fig. 3 is an end view of the inlet end of the engine, showing the outer protecting plate removed, Fig. 4 is an end view of the exhaust end of the engine, showing the outer protecting plate removed, Fig. 5 is a side elevation of the rotor, Fig. 6 is an end view of the rotor, Fig. 7 is a perspective view of the inlet port construction, Fig. 8 is a perspective view of the exhaust port construction, and Fig. 9 is a fragmentary sectional view through a part of the rotor structure of the engine.

Referring more particularly to the drawings, 1 designates the bed plate of the engine structure, which has a cylinder 2 mounted thereupon. The cylinder 2 has heads 3 and 4 detachably connected thereto, by means of bolts or analogous fastening means indicated at 5. The heads 3 and 4 are hollow, and have conduits or pipes 6 communicating therewith, as clearly shown in Fig. 1 of the drawings. The head 3 further has a horizontally disposed sleeve 7 formed thereupon, which forms a bearing for the shaft 8, upon which the rotor 9 is mounted. The sleeve 7 has a stuffing box 10 of the ordinary construction associated therewith, as is clearly shown in Fig. 1. The bed plate 1 has its ends bent upwardly as is indictaed at 11, and provided with bearing openings 12, in which are rotatably seated the ends of the shaft 8. The rotor 9 has a plurality of radially extending spiral blades 15, the outer edges of which are provided with recesses 16 in which are seated blades 17 which correspond with the ordinary type of piston rings. The blades 15 have a plurality of spiral springs 18 seated therein which engage the inner edges of the blades 17 and tend to force them outwardly in engagement with the wall of the cylinder 2, at all times during the rotation of the rotor.

The cylinder 2 has disks 20 and 21 mounted in the ends thereof, which disks are provided with notches 22 formed therein and extending inwardly toward the center of the disks, as is clearly shown in Figs. 7 and 8. The disk 20, which is mounted in the inlet end of the cylinder 2, has openings or notches 22 corresponding in number to the number of blades of the rotor 9, while the disk 21, which is positioned in the outlet end of the cylinder and is provided for controlling the exhaust of the steam, has practically one-half the number of cut-out portions or notches which are formed in the disk 20. The disks 20 and 21 are mounted firmly against rotation within the cylinder, and they control the inlet end of exhaust of the steam or fuel into the engine.

In the operation of the improved engine, the steam or other fuel, passes through the conduits 6 upon the head 3 and into engagement with the outer surface of the disk 20, passing through the cut-out portions or notches 22 formed therein, when it engages the spiral blades 15 of the rotor 9. The steam traveling along the surfaces of the spiral blades of the rotor 9, will tend to rotate the same, and by a quantity of steam continuously entering the cylinder, and engaging the spiral blades, any desired speed of rotation of the rotor may be employed. The steam or other fuel, travels along the surfaces of the spiral blades 15, and outwardly through the openings or notches 22 which are formed in the disk 21, and from thence through the pipes or conduits 6, which are formed upon the heads 4, for atmospherical distribution. By providing fewer notches or openings in the exhaust end of the cylinder, the steam will be compelled to remain between the adjacent blades of the rotor until the opening in which it is contained alines with one of the openings 22 formed in the disk 21, which will allow the same to escape.

From the foregoing description taken in connection with the accompanying drawings the advantages of construction and of the method of operation of the improved rotary engine will be readily apparent to those skilled in the art to which this invention appertains and, while in the foregoing description, the principles of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a rotary engine, a cylinder, a rotor rotatably mounted within said cylinder, a plurality of spiral blades formed upon said rotor, a disk mounted within the inlet end of said cylinder and being provided with a plurality of cutout portions extending inwardly from the periphery thereof, said openings corresponding in number to the spiral blades of said rotor, a second disk mounted in the exhaust end of said cylinder and being provided with openings extending radially inwardly from the periphery thereof, said openings in said outlet end disk being substantially one-half as many as the blades of said rotor, said spiral rotor blades being provided with longitudinally extending recesses formed in their edges, a plurality of spiral springs carried by said rotor blades and communicating with the base of said recesses, and blades loosely seated in said recesses and engaged by said springs.

2. In a rotary engine, a cylinder, a rotor rotatably mounted within said cylinder, a plurality of spiral blades formed upon said rotor, a disk mounted in the inlet end of said cylinder and being provided with a plurality of cut-out portions extending inwardly from the periphery thereof, said openings corresponding in number to the spiral blades of said rotor, and a second disk mounted in the exhaust end of said cylinder and being provided with openings extending radially inwardly from the periphery thereof, said openings in said outlet end disk being substantially one half as many as the blades of said rotor.

3. In a rotary engine, a cylinder, a rotor rotatably mounted within said cylinder, a plurality of spiral blades formed upon said rotor, a disk mounted in the inlet end of said cylinder and being provided with a plurality of cut-out portions extending inwardly from the periphery thereof, said openings corresponding in number to the spiral blades of said rotor, a second disk mounted in the exhaust end of said cylinder and being provided with openings extending radially inwardly from the periphery thereof, said openings in said outlet end disk being substantially one half as many as the blades of said rotor, a bed plate for supporting said cylinder, said bed plate having its ends bent upwardly and forming bearings, and a shaft carried by said rotor and rotatably seated in said bearings.

In testimony whereof I affix my signature in presence of two witnesses.

EUGENE O. SEAWRIGHT.

Witnesses:
HENRY M. BLALOCK,
E. R. BLALOCK.

Copies of this patent may be obtained for five cents each, by addressing the "Commissioner of Patents, Washington, D. C."